(12) United States Patent
Chon

(10) Patent No.: US 11,821,056 B2
(45) Date of Patent: Nov. 21, 2023

(54) LITHIUM EXTRACTION METHOD

(71) Applicant: Uong Chon, Seoul (KR)

(72) Inventor: Uong Chon, Seoul (KR)

(*) Notice: Subject to any disclaimer, the term of this patent is extended or adjusted under 35 U.S.C. 154(b) by 0 days.

(21) Appl. No.: 17/815,823

(22) Filed: Jul. 28, 2022

(65) Prior Publication Data

US 2022/0372594 A1 Nov. 24, 2022

Related U.S. Application Data

(63) Continuation of application No. PCT/KR2020/001372, filed on Jan. 29, 2020.

(51) Int. Cl.
*C22B 26/12* (2006.01)
*C01D 15/08* (2006.01)
*C22B 3/06* (2006.01)

(52) U.S. Cl.
CPC .............. *C22B 26/12* (2013.01); *C01D 15/08* (2013.01); *C22B 3/06* (2013.01); *C01P 2002/72* (2013.01); *C01P 2006/80* (2013.01)

(58) Field of Classification Search
CPC ........... C22B 26/12; C22B 3/06; C01D 15/08; C01P 2002/72; C01P 2006/80
USPC ...................................................... 423/179.5
See application file for complete search history.

(56) References Cited

U.S. PATENT DOCUMENTS

| 9,598,291 | B2 | 3/2017 | Chon et al. | |
| 9,994,931 | B2* | 6/2018 | Chon | ........................ C22B 3/42 |

FOREIGN PATENT DOCUMENTS

| AR | 110525 A1 | 4/2019 | |
| CN | 106745099 A | 5/2017 | |
| CN | 107787302 A | 3/2018 | |
| CN | 108281726 A | 7/2018 | |
| CN | 108285156 A | 7/2018 | |
| CN | 109987616 A | 7/2019 | |
| JP | 5528153 B2 | 6/2014 | |
| JP | 5632169 B2 | 11/2014 | |
| JP | 2018522709 A | 8/2018 | |
| KR | 101257434 B1 | 4/2013 | |
| KR | 101405484 B1 | 6/2014 | |
| KR | 101405486 B1 | 6/2014 | |
| KR | 20160129657 A | 11/2016 | |
| KR | 20180069736 A | 6/2018 | |
| KR | 101888181 B1 | 8/2018 | |
| KR | 101946483 B1 | 2/2019 | |
| KR | 20190072995 A | 6/2019 | |
| KR | 20200058611 A | 5/2020 | |
| RU | 1824377 A1 | 6/1993 | |
| RU | 2684384 C1 | 4/2019 | |
| WO | 2016175613 A1 | 11/2016 | |
| WO | 2018027266 A1 | 2/2018 | |
| WO | WO-2021153816 A1 * | 8/2021 | ............. C01B 25/30 |

OTHER PUBLICATIONS

Search Report issued in Russian Patent Application No. 2022122874, dated Aug. 29, 2022 (10 pages).
Extended European Search Report issued in European Application No. 20916824.4, dated Dec. 5, 2022 (7 pages).
Office Action issued in corresponding JP Application No. 2022543737 dated Apr. 5, 2023 (3 pages).

* cited by examiner

*Primary Examiner* — Edward M Johnson
(74) *Attorney, Agent, or Firm* — Osha Bergman Watanabe & Burton LLP

(57) ABSTRACT

The lithium extraction method includes providing lithium phosphate containing impurities of an alkaline earth metal; dissolving the lithium phosphate and the impurities in an acid; and preparing a lithium-containing solution by adding an additive to a solution prepared by dissolving the lithium phosphate and the impurities in the acid. The additive is a substance capable of simultaneously precipitating phosphate anions and the impurities, and the lithium-containing solution prepared through addition of the additive is basic.

10 Claims, 3 Drawing Sheets

LITHIUM EXTRACTION METHOD

CROSS-REFERENCE TO RELATED APPLICATION

The disclosure is a continuation of International Application No. PCT/KR2020/001372 filed on Jan. 29, 2020, the disclosure of which is herein incorporated by reference in its entireties.

TECHNICAL FIELD

The present invention relates to a method for extracting lithium.

BACKGROUND

Recently, lithium secondary batteries are widely used as a power source for IT devices such as mobile phones and laptops and are attracting attention as a power source for electric vehicles. Lithium secondary batteries are expected to be more in demand in the foreseeable future as sales of electric vehicles and renewable energy and electricity storage systems will rise.

Lithium used as a raw material for a cathode, an anode, and an electrolyte, which are important components of electric vehicles and electricity storage systems, is available in the form of lithium carbonate ($Li_2CO_3$). Therefore, there is a need for a technology capable of economically manufacturing lithium carbonate in order to cheaply produce and smoothly supply electric vehicles and electricity storage systems, demand for which is expected to increase drastically.

Generally, lithium carbonate is produced by concentrating natural brine containing about 0.2 g/L to 1.5 g/L of lithium to a high lithium concentration of about 60 g/L through natural evaporation and precipitating lithium in the form of lithium carbonate ($Li_2CO_3$) through addition of carbonate. However, due to high solubility of lithium carbonate (13 g/L), brine needs to be subjected to an evaporation/concentration process over a long period of time (more than a year) in order to reach a lithium concentration of about 60 g/L, which results in a large loss of lithium due to precipitation during the evaporation/concentration process.

In order to solve such a problem, there has been proposed a lithium phosphate ($Li_3PO_4$) extraction method capable of minimizing the natural evaporation process (Korean Patent Registration No. 10-1363342). Due to low solubility of lithium phosphate (0.39 g/L), extraction of lithium in the form of lithium phosphate using the lithium phosphate extraction method can eliminate or greatly shorten the brine evaporation/concentration process requiring a long time while allowing extraction of lithium at a high recovery rate through suppression of loss of lithium occurring during the evaporation/concentration process. However, as described above, lithium phosphate needs to be converted into lithium carbonate in order to be used as a raw material for lithium secondary batteries.

Recently, there has been proposed a lithium carbonate production method in which $Ca(OH)_2$ is mixed with a high-temperature (90° C. or higher) lithium phosphate-water slurry to prepare a low-concentration lithium hydroxide solution (lithium concentration: 5 g/L or less), which, in turn, is concentrated into a high-concentration lithium hydroxide solution (lithium concentration: 30 g/L or more) through evaporation, followed by addition of carbon dioxide ($CO_2$) gas to the high-concentration lithium hydroxide solution.

However, conversion of lithium phosphate into lithium carbonate by this method requires a process of heating the lithium phosphate-water slurry to a high temperature, reacting the heated slurry for a long time, and concentrating the low-concentration lithium hydroxide solution through evaporation, thus causing increase in energy costs (see Korea Patent Registration No. 10-1405486).

In addition, there has been proposed a lithium carbonate production method in which lithium phosphate is dissolved in an acid to prepare a lithium solution having a lithium concentration of 0.05 g/L to 0.16 g/L, followed by reacting carbon dioxide gas with an aqueous lithium hydroxide solution (lithium concentration: 3.5 g/L to 4.5 g/L) prepared by removing divalent alkaline earth metal ions and phosphorus from the prepared lithium solution using an ion exchange resin and subjecting the resulting lithium solution to bipolar electrodialysis, thereby producing lithium carbonate.

However, this method has problems of: low lithium recovery rate due to very low lithium concentration in the lithium solution; necessity of expensive, large-scale electrolysis equipment; and great increase in manufacturing costs due to large electricity consumption (see Korean Patent Registration 10-1888181).

In addition, there has been proposed a lithium carbonate production method in which a lithium phosphate-metal compound slurry (the metal compound being at least one selected from among iron, copper, lead, zinc, manganese, calcium, cerium, yttrium, and lanthanum compounds) is dissolved in an acid, followed by addition of alkali hydroxide to adjust the resulting solution to a pH of 1 to 10, thereby preparing a high-concentration lithium solution with a metal and phosphorus removed therefrom, and then a carbonate is added thereto, thereby producing lithium carbonate. However, this method requires increased consumption of the acid to dissolve both lithium phosphate and the metal compound. In addition, since the pH of the reaction solution is limited to a range of 1 to 10 upon adding the alkali to induce precipitation of metal ions present in the acidic solution in which lithium phosphate is dissolved, there is a possibility that heavy metal ions are not completely removed. Further, since pH adjustment is performed through addition of the alkali after dissolving the lithium phosphate-metal compound slurry in the acid, the production process is complicated and requires increased consumption of raw and supplementary materials, causing reduction in economic feasibility (see Japanese Patent Registration No. JP5632169B2 and Japanese Patent Registration NO. JP5528153B2).

As described above, these conventional lithium carbonate production methods have problems of low economic feasibility due to low lithium recovery rate, high energy and investment costs, excessive raw and supplementary material costs, and a complicated production process. Therefore, there is an urgent need for a technology capable of economically producing lithium carbonate using lithium phosphate.

SUMMARY

It is one object of the present invention to provide a lithium extraction method that can provide a high lithium recovery rate.

It is another object of the present invention to provide a lithium extraction method that can economically produce a lithium compound from lithium phosphate through reduction in energy consumption, raw and supplementary material cost, equipment investment cost, and process complexity.

DETAILED DESCRIPTION

In accordance with one aspect of the present invention, there is provided a lithium extraction method including the steps of: preparing lithium phosphate containing impurities; dissolving the lithium phosphate and the impurities in an acid; and preparing a lithium-containing solution by adding an additive to a solution prepared by dissolving the lithium phosphate and the impurities in the acid, wherein the additive is a substance capable of simultaneously precipitating phosphate anions and the impurities, and the lithium-containing solution prepared through addition of the additive is basic.

The impurities may include an alkaline earth metal.

The alkaline earth metal may be beryllium (Be), magnesium (Mg), calcium (Ca), strontium (Sr), barium (Ba), radium (Ra), or a combination thereof.

The solution prepared by dissolving the lithium phosphate and the impurities in the acid has a lithium concentration of 10 g/L to 35 g/L.

In the step of dissolving the lithium phosphate and the impurities in the acid, the acid may be hydrochloric acid, hypochlorous acid, nitric acid, acetic acid, or a combination thereof.

The solution prepared by dissolving the lithium phosphate and the impurities in the acid has a pH of −0.1 to 4.5.

The additive may be an oxide or a hydroxide.

The additive may be an oxide or hydroxide of a cation selected from among beryllium, magnesium, calcium, strontium, barium, radium, or a combination thereof.

More specifically, the additive may be calcium hydroxide ($Ca(OH)_2$), magnesium hydroxide ($Mg(OH)_2$), or a combination thereof.

The phosphate anions and the impurities may be precipitated in the form of a sparingly soluble precipitate from the solution prepared by dissolving the lithium phosphate and the impurities in the acid.

The sparingly soluble precipitate may be hydroxyapatite ($Ca_5(PO_4)_3OH$), brushite ($CaHPO_4.2H_2O$), an amorphous calcium-phosphorus compound, calcium hydroxide, newberyite ($MgHPO_4.3H_2O$), magnesium phosphate ($Mg_3(PO_4)_2$), an amorphous magnesium-phosphorus compound, magnesium hydroxide, or a mixture thereof.

In the step of preparing the lithium-containing solution by adding the additive to the solution prepared by dissolving the lithium phosphate and the impurities in the acid, the prepared lithium-containing solution may have a pH of 9 or higher.

In the step of preparing the lithium-containing solution by adding the additive to the solution prepared by dissolving the lithium phosphate and the impurities in the acid, the prepared lithium-containing solution may have a pH of 11 or higher.

The lithium extraction method may further include: obtaining lithium carbonate by adding a carbonic acid feed material to the prepared lithium-containing solution.

The carbonic acid feed material may be sodium carbonate ($Na_2CO_3$), potassium carbonate ($K_2CO_3$), ammonium carbonate (($NH_4)_2CO_3$), sodium bicarbonate ($NaHCO_3$), potassium bicarbonate ($KHCO_3$), or a combination thereof.

The lithium extraction method may further include washing and drying the prepared lithium carbonate.

Embodiments of the present invention provides a method of extracting lithium from lithium phosphate containing impurities (more specifically, an alkaline earth metal), wherein the method can economically produce a lithium compound (for example, lithium carbonate) through increase in lithium recovery rate and reduction in energy cost, raw and supplementary material cost, and equipment investment cost.

Table 2 shows the chemical content and pH of reaction filtrates prepared by adding 10 g of magnesium-containing lithium phosphate to 0.1 L of an aqueous hydrochloric acid solution at room temperature to prepare a magnesium-containing lithium phosphate solution (pH: 4.33) and adding calcium hydroxide in varying amounts from 2.3 g to 23.8 g to the prepared solution, followed by stirring for 2 hours and filtration.

Figure 2:
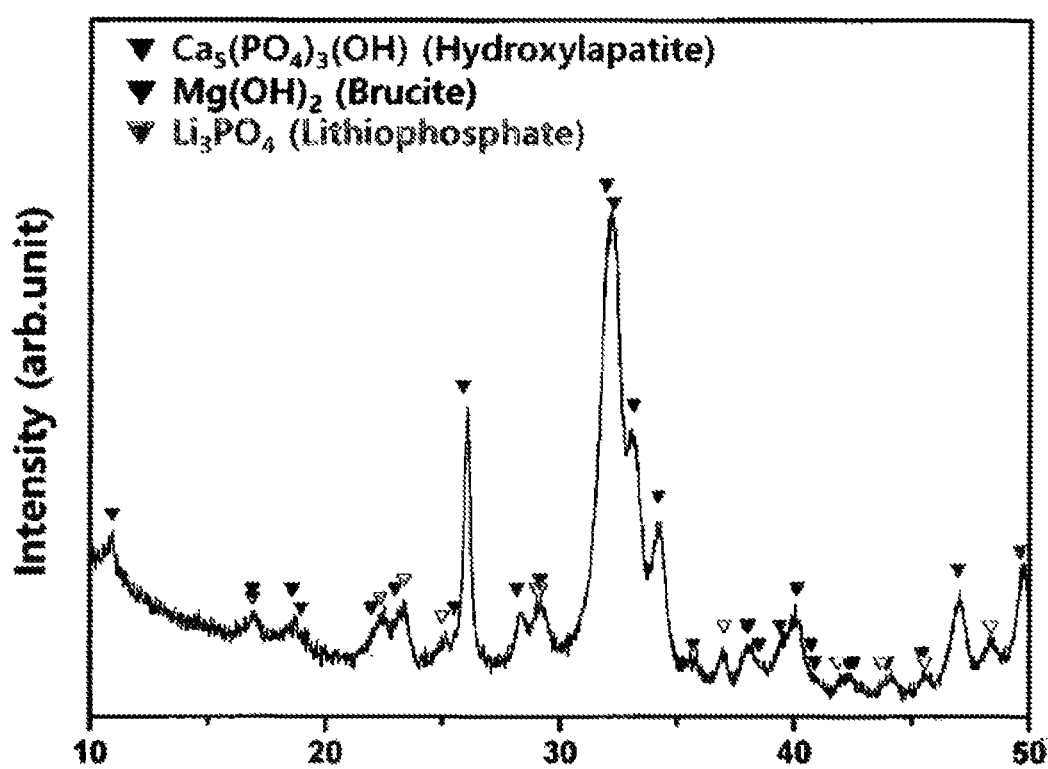

FIG. 2 shows the X-ray diffraction pattern of precipitates prepared by adding 10 g of magnesium-containing lithium phosphate to 0.1 L of an aqueous hydrochloric acid solution at room temperature to prepare a magnesium-containing lithium phosphate solution (pH: 4.33) and adding calcium hydroxide in varying amounts from 2.3 g to 23.8 g to the prepared solution, followed by stirring for 2 hours, filtration, washing, and drying.

Figure 3:
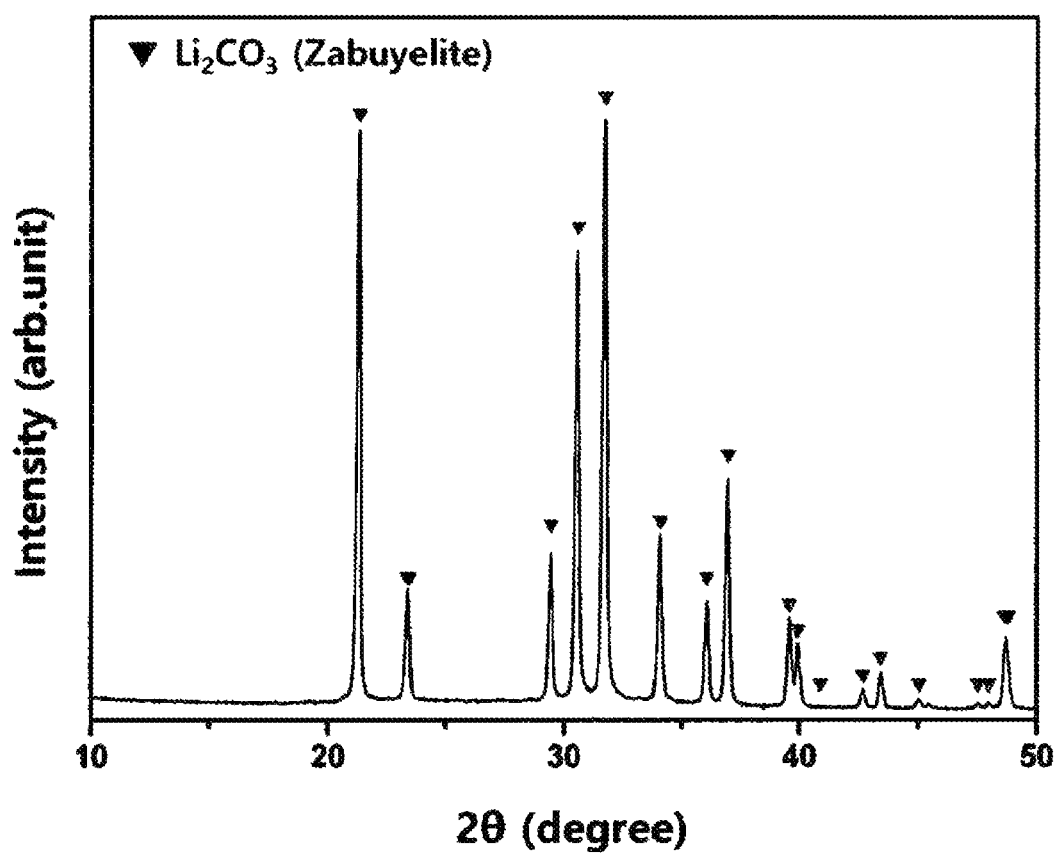

FIG. 3 shows the X-ray diffraction pattern of a precipitate prepared by adding 6.478 g of $Na_2CO_3$ to 0.1 L of a lithium phosphate solution with magnesium and phosphorus removed therefrom at room temperature, followed by stirring for 2 hours, filtration, washing, and drying.

Exemplary embodiments of the present invention will be described in detail such that such that the present invention can be easily implemented by those skilled in the art. It should be understood that the present invention may be embodied in different ways and is not limited to the following embodiments.

In the drawings, portions irrelevant to the description will be omitted for clarity. Like components will be denoted by like reference numerals throughout the specification.

In addition, it will be understood that the terms "includes", "comprises", "including", and/or "comprising," when used in this specification, specify the presence of stated elements, but do not preclude the presence or addition of one or more other elements.

One aspect of the present invention relates to a lithium extraction method including: preparing lithium phosphate containing impurities; dissolving the lithium phosphate and the impurities in an acid; and preparing a lithium-containing solution by adding an additive to a solution prepared by dissolving the lithium phosphate and the impurities in the acid, wherein the additive is a substance capable of simultaneously precipitating phosphate anions and the impurities, and the lithium-containing solution prepared through addition of the additive is basic.

In one embodiment, lithium phosphate containing impurities (for example, an alkaline earth metal) may be dissolved in an aqueous hydrochloric acid solution as the acid at room temperature, thereby preparing a high-concentration lithium phosphate solution, followed by removal of the impurities and phosphorus through addition of calcium hydroxide as the additive to the prepared lithium phosphate solution at room temperature.

The lithium extraction method may further include: adding a carbonate (for example, sodium carbonate) to the prepared lithium-containing solution at room temperature to obtain lithium carbonate; and washing the prepared lithium carbonate with tap water, followed by drying at high temperatures (for example, 105° C.). As such, the lithium extraction method can economically produce lithium carbonate.

Dissolution of the lithium phosphate containing impurities (magnesium, which is an alkaline earth metal) in the aqueous hydrochloric acid solution may be represented by Reaction Scheme 1.

$$(Mg,Li)PO_4+2HCl+3H_2O \rightarrow Li^++Mg^{2+}+H_2PO_4^-+ \\ 2Cl^-+3H_2O \qquad \text{<Reaction Scheme 1>}$$

That is, the magnesium-containing lithium phosphate is converted into a lithium phosphate solution containing Li+, $Mg_2+$, $H_2PO_4^-$, and $Cl^-$ through dissolution in hydrochloric acid at room temperature.

The acid used to dissolve the lithium phosphate may include, for example, hydrochloric acid, hypochlorous acid, nitric acid, acetic acid, or a combination thereof. Since sulfuric acid can form a precipitate through reaction with an alkaline earth metal such as calcium, causing formation of acidic sludge, and phosphorus contained in phosphoric acid is a substance that needs to be eventually removed, it is desirable not to use sulfuric acid in terms of reduction in phosphorus removal costs. However, it should be understood that a small quantity of sulfuric acid may be selectively used depending on the type of impurities to be removed.

The lithium carbonate has a solubility of 13 g/L, which corresponds to 2.5 g/L in terms of lithium concentration. Accordingly, the concentration of lithium in the lithium phosphate solution needs to be 10 g/L or more in order to achieve a high lithium recovery rate of 75% or more in production of lithium carbonate through precipitation from the lithium phosphate solution.

Accordingly, in the present invention, the concentration of lithium in the lithium phosphate solution is set to 10 g/L or more. More preferably, the concentration of lithium in the lithium phosphate solution is 30 g/L, which corresponds to a lithium recovery rate of 91.7%.

As described further below, a reaction solution prepared by mixing lithium phosphate with the aqueous acid solution needs to have a pH of 4.5 or less in order to obtain a lithium phosphate solution having a lithium concentration of 10 g/L or more. This will be described in more detail in exemplary embodiments given below.

Removal of an alkaline earth metal and phosphorus according to one embodiment of the present invention may be represented by Reaction Scheme 2 or 3.

$$Li^++Mg^{2+}+H_2PO_4^-.2Cl^-+3H_2O+Ca(OH)_2 \rightarrow Li^++H^++ \\ 2Cl^-+Mg(OH)_2^+CaHPO_4.2H_2O+H_2O \quad \text{<Reaction Scheme 2>}$$

$$3Li^++3Mg^{2+}+3H_2PO_4^-.6Cl^-+9H_2O+5Ca(OH)_2 \rightarrow \\ 3Li^++Cl^-+2OH^-+3Mg(OH)_2+Ca_5(PO_4)_3.OH+ \\ 10H_2O+5HCl(g) \qquad \text{<Reaction Scheme 3>}$$

The additive used to remove an alkaline earth metal and phosphorus may be a substance that generates hydroxide ions ($OH^-$) producing a sparingly soluble compound through reaction with phosphorus at room temperature while producing a sparingly soluble compound through reaction with an alkaline earth metal. As such, the additive can simultaneously precipitate phosphorus and an alkaline earth metal, that is, impurities.

More specifically, the additive may be an alkaline earth metal oxide or hydroxide.

For example, a cation of the additive may be beryllium, magnesium, calcium, barium, radium, or a combination thereof, and the additive may be an oxide or hydroxide thereof.

In one embodiment, the additive may be calcium hydroxide, magnesium hydroxide, or a combination thereof. In another embodiment, the additive may be calcium oxide or magnesium oxide.

For example, calcium oxide or magnesium oxide may be obtained by heating calcium carbonate ($CaCO_3$) or magnesium carbonate ($MgCO_3$). In addition, calcium hydroxide or magnesium hydroxide may be obtained by adding water to calcium oxide or magnesium oxide thus obtained.

In one embodiment, calcium hydroxide as the additive may be added to the lithium phosphate solution containing impurities at room temperature to remove the impurities (for example, an alkaline earth metal) and phosphorus from the lithium phosphate solution.

In this embodiment, magnesium may be precipitated in the form of sparingly soluble magnesium hydroxide and phosphorus may be precipitated in the form of sparingly soluble hydroxyapatite ($Ca_5(PO_4)_3.OH$) or brushite ($CaHPO_4.2H_2O$). These precipitates may be removed from the lithium phosphate solution through filtration.

The additive may be added in an amount of 1 molar equivalent or more relative to the amount of phosphorus in order to completely remove phosphorus from the lithium phosphate solution. The amount of the additive within this range is advantageous in terms of reaction rate with phosphorus while ensuring complete removal of phosphorus.

The amount of the additive may be set to a value ensuring that the lithium phosphate solution is maintained at a pH of 9 or more, or preferably 11 or more, such that an alkaline earth metal and phosphorus can be completely removed from the lithium phosphate solution through precipitation.

Production of lithium carbonate according to one embodiment of the present invention may be represented by Reaction Scheme 4.

In one embodiment, sodium carbonate as a carbonic acid feed material may be added to precipitate lithium carbonate from the lithium-containing solution with the alkaline earth metal and phosphorus removed therefrom at room temperature.

$$6Li^++2Cl^-+4OH^-+20H_2O+3Na_2CO_3 \rightarrow 3Li_2CO_3+ \\ 6Na^++2Cl^-+4OH^-+20H_2O \qquad \text{<Reaction Scheme 4>}$$

That is, sodium carbonate produces and precipitates lithium carbonate though reaction with lithium at room temperature. In addition, when sodium carbonate is added in an amount of 1 molar equivalent or more relative to the amount of lithium in the lithium-containing solution with the alkaline earth metal and phosphorus removed therefrom, lithium carbonate can be obtained at a high recovery rate of 75% or more.

Examples of the carbonate may include sodium carbonate, potassium carbonate, and ammonium carbonate.

More specifically, the carbonate may be sodium bicarbonate, sodium carbonate, potassium bicarbonate, ammonium carbonate, or a combination thereof.

Lithium carbonate may be added in an amount of 1 molar equivalent or more relative to the amount of lithium in the lithium-containing solution. The amount of carbonate within this range is advantageous in terms of reaction rate with the lithium-containing solution.

Herein, "room temperature" refers to a temperature when there is no addition of external energy, rather than a certain constant temperature. Accordingly, room temperature may be changed from place to place and across time.

Next, the present invention will be described in more detail with reference to some examples. It should be understood that these examples are provided for illustration only and are not to be construed in any way as limiting the present invention.

EXAMPLES

Example 1

In order to produce a high-concentration lithium solution (lithium concentration: 10 g/L), 10 g of magnesium-containing lithium phosphate was mixed with 0.1 L of each of aqueous hydrochloric acid solutions having different acidities at room temperature, followed by stirring for 60 minutes.

After completion of stirring, each of the resulting reaction solutions was filtered, followed by measurement of pH and lithium concentration. Results are shown in FIG. 1 and Table 1.

Figure 1:
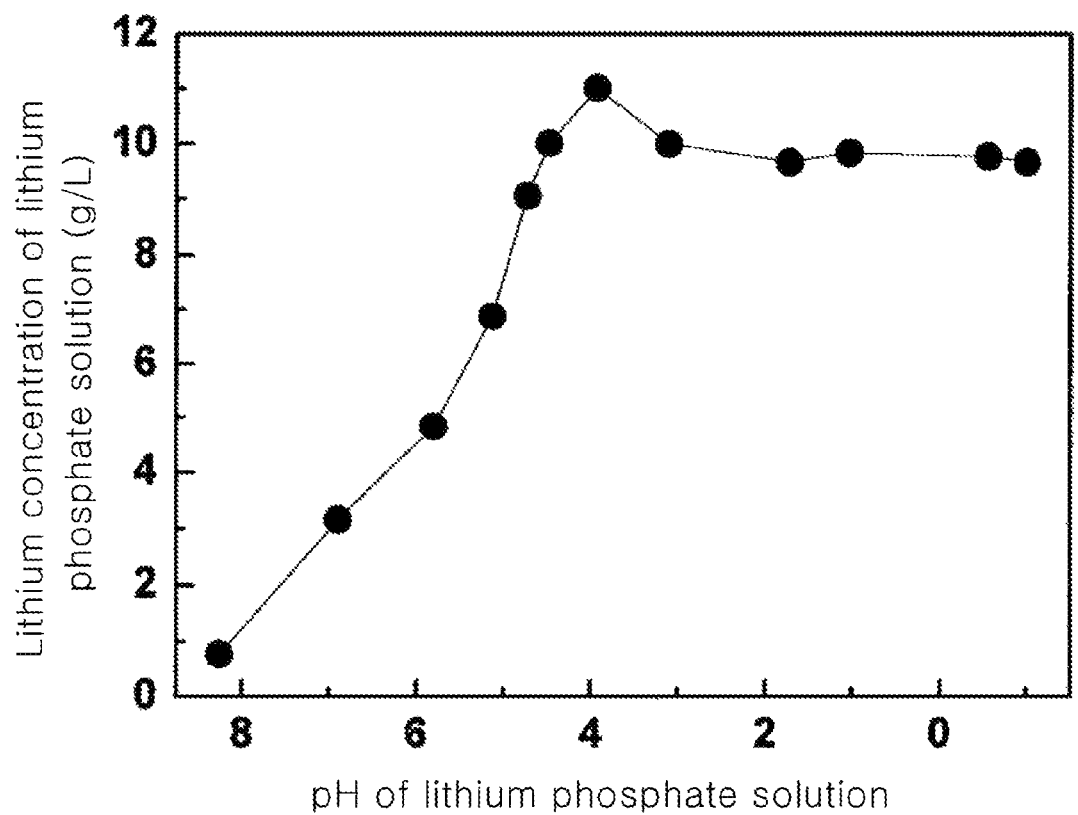
FIG. 1 and Table 1 show the pH and lithium concentration of reaction filtrates prepared by mixing 10 g of magnesium-containing lithium phosphate with 0.1 L of aqueous hydrochloric acid solutions having different acidities at room temperature, followed by stirring for 60 minutes and filtration, the reaction filtrates being prepared to produce a high-concentration lithium solution (lithium concentration: 10 g/L).

As shown in FIG. 1, with decreasing reaction solution pH, the lithium concentration gradually increased due to increase in dissolution of lithium phosphate. In addition, it can be seen that, at a reaction filtrate pH of 4.5, the lithium concentration reached about 10 g/L and, at a reaction filtrate pH of less than 4.5, the lithium concentration did not increase any more.

These results show that, at a reaction filtrate pH of 4.5 or less, the entire quantity of lithium phosphate is dissolved. An excessively low reaction filtrate pH (for example, −1.0 or less) can cause excessive increase in hydrochloric acid consumption, despite allowing dissolution of the entire quantity of lithium phosphate.

the presence of interlayer water between unreacted precipitates. Accordingly, it is desirable that the pH of the lithium phosphate solution with an alkaline earth metal oxide or hydroxide added thereto be controlled within a range of 11 to less than 14.

Each of the precipitates filtered from the corresponding reaction solutions was washed with tap water and then dried at 105° C. for 24 hours. A mineral phase of a precipitate filtered from a reaction solution having a pH of 11.35 was analyzed using an X-ray diffractometer. Results are shown in FIG. 2.

As shown in FIG. 2, magnesium and phosphorus were completely removed from the lithium phosphate solution, wherein magnesium was precipitated in the form of sparingly soluble magnesium hydroxide and phosphorus was mostly precipitated in the form of sparingly soluble hydroxyapatite and partially precipitated in the form of lithium phosphate.

TABLE 1

| Lithium concentration of reaction filtrate (g/L) | 0.789 | 3.165 | 4.841 | 6.884 | 9.070 | 10.003 | 11.008 |
|---|---|---|---|---|---|---|---|
| pH of reaction filtrate | 8.26 | 6.89 | 5.80 | 5.13 | 4.73 | 4.48 | 3.93 |
| Lithium concentration of reaction filtrate (g/L) | 9.997 | 9.667 | 9.829 | 9.769 | 9.669 | — | — |
| pH of reaction filtrate | 3.10 | 1.72 | 1.03 | −0.55 | −1.0 | — | — |

Example 2

A magnesium-containing lithium phosphate solution (pH: 4.33) was prepared by adding 10 g of lithium phosphate containing magnesium to 0.1 L of an aqueous hydrochloric acid solution at room temperature, followed by stirring for 1 hour.

Then, calcium hydroxide was added in varying amounts from 2.3 g to 23.8 g to the lithium phosphate solution, followed by stirring for 2 hours and filtration of each of the resulting precipitates.

As shown in Table 2, it can be seen that phosphorus and magnesium are completely removed at a reaction filtrate pH of 11 or higher. Although increasing the reaction solution pH to 14 or higher through addition of a large amount of calcium hydroxide can also allow complete removal of phosphorus and magnesium, excessive use of calcium hydroxide can cause increase in raw and supplementary material costs and reduction in lithium recovery rate due to

TABLE 2

| Item | | Li | P | Mg | pH of reaction solution |
|---|---|---|---|---|---|
| Chemical content of reaction filtrate (mg/L) | Magnesium-containing lithium phosphate solution | 10,198 | 16,751 | 2,394 | 4.33 |
| | Input amount of Ca(OH)$_2$ (g)  2.31 | 8,160 | 959 | 653 | 5.40 |
| | 3 | 8.132 | 429 | 380 | 7.50 |
| | 3.79 | 7.691 | 7 | 309 | 9.41 |
| | 5.05 | 8.230 | 3 | 19 | 9.81 |
| | 5.4 | 8.199 | 1 | 13 | 10.34 |
| | 5.68 | 8.017 | 0 | 0 | 11.35 |
| | 5.92 | 8.015 | 0 | 0 | 11.75 |
| | 23.8 | 9.498 | 0 | 0 | 12.23 |

Example 3

64.78 g of Na$_2$CO$_3$ was added to 1 L of a lithium-containing solution with magnesium and phosphorus removed therefrom at room temperature, followed by reaction for 2 hours under stirring, and then the resulting precipitate was filtered.

The precipitate filtered from the reaction solution was washed with tap water and then dried at 105° C. for 24 hours, followed by analysis of a mineral phase of the precipitate using an X-ray diffractometer. Results of the analysis are shown in FIG. 3. As shown in FIG. 3, the precipitate was observed as a single phase of lithium carbonate, indicating that lithium carbonate was well synthesized.

Although some embodiments have been described herein, it should be understood that various modifications, changes, alterations, and equivalent embodiments can be made by those skilled in the art without departing from the spirit and scope of the invention. Therefore, it should be understood that these embodiments are provided for illustration only and are not to be construed in any way as limiting the present invention.

What is claimed:

1. A lithium extraction method comprising the steps of:
preparing lithium phosphate containing impurities;
dissolving the lithium phosphate and the impurities in an aqueous acid solution; and
preparing a lithium-containing solution by adding an additive to a solution prepared by dissolving the lithium phosphate and the impurities in the aqueous acid solution,
wherein:
the additive is a substance capable of simultaneously precipitating phosphate anions and the impurities,
the lithium-containing solution prepared through addition of the additive is basic,
the impurities comprise an alkaline earth metal, and
the solution prepared by dissolving the lithium phosphate and the impurities in the aqueous acid solution has a pH of −0.1 to 4.5.

2. The lithium extraction method according to claim 1, wherein the alkaline earth metal is beryllium (Be), magnesium (Mg), calcium (Ca), strontium (Sr), barium (Ba), radium (Ra), or a combination thereof.

3. The lithium extraction method according to claim 1, wherein the solution prepared by dissolving the lithium phosphate and the impurities in the aqueous acid solution has a lithium concentration of 10 g/L to 35 g/L.

4. The lithium extraction method according to claim 1, wherein, in the step of dissolving the lithium phosphate and the impurities in the aqueous acid solution, the acid is hydrochloric acid, hypochlorous acid, nitric acid, acetic acid, or a combination thereof.

5. The lithium extraction method according to claim 1, wherein the additive is an oxide or a hydroxide.

6. The lithium extraction method according to claim 5, wherein the additive is an oxide or hydroxide of a cation selected from among beryllium, magnesium, calcium, strontium, barium, radium, or a combination thereof.

7. The lithium extraction according to claim 1, wherein, in the step of preparing the lithium-containing solution by adding the additive to the solution prepared by dissolving the lithium phosphate and the impurities in the acid, the prepared lithium-containing solution has a pH of 9 or higher.

8. The lithium extraction method according to claim 1, wherein, in the step of preparing the lithium-containing solution by adding the additive to the solution prepared by dissolving the lithium phosphate and the impurities in the acid, the prepared lithium-containing solution has a pH of 11 or higher.

9. The lithium extraction method according to claim 1, further comprising:
obtaining lithium carbonate by adding a carbonic acid feed material to the prepared lithium-containing solution.

10. The lithium extraction method according to claim 9, wherein the carbonic acid feed material is sodium carbonate ($Na_2CO_3$), potassium carbonate ($K_2CO_3$), ammonium carbonate ($(NH_4)_2CO_3$), sodium bicarbonate ($NaHCO_3$), potassium bicarbonate ($KHCO_3$), or a combination thereof.

* * * * *